United States Patent
Bryan

(10) Patent No.: US 10,644,929 B2
(45) Date of Patent: May 5, 2020

(54) DEFINING CONFIGURABLE CHARACTERISTICS OF A PRODUCT AND ASSOCIATING CONFIGURATION WITH ENTERPRISE RESOURCES

(71) Applicant: Oracle International Corporation, Redwood Shores, CA (US)

(72) Inventor: Jeffrey J. Bryan, Mountain House, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 57 days.

(21) Appl. No.: 15/467,271

(22) Filed: Mar. 23, 2017

(65) Prior Publication Data

US 2017/0195165 A1 Jul. 6, 2017

Related U.S. Application Data

(63) Continuation of application No. 14/012,892, filed on Aug. 28, 2013, now Pat. No. 9,632,764.

(Continued)

(51) Int. Cl.
*G06F 15/16* (2006.01)
*H04L 29/08* (2006.01)
(Continued)

(52) U.S. Cl.
CPC .............. *H04L 41/046* (2013.01); *G06F 8/61* (2013.01); *G06F 8/71* (2013.01); *G06F 9/44505* (2013.01);
(Continued)

(58) Field of Classification Search
CPC ......... G06F 9/445–454; G06F 8/20–78; G06F 8/61; G06F 8/71; G06F 21/10; H04L 41/04–048; H04L 67/02–08; H04L 65/607; H04L 65/1063; H04L 41/046; H04L 67/42; H04L 67/20; H04L 67/28; H04L 63/0428; H04L 63/20; H04L 69/16; H04L 67/10; H04L 67/22; H04L 65/403;
(Continued)

(56) References Cited

U.S. PATENT DOCUMENTS

| | | | |
|---|---|---|---|
| 7,409,674 B2 * | 8/2008 | Shenfield | H04L 29/06 717/114 |
| 7,522,060 B1 | 4/2009 | Tumperi et al. | |

(Continued)

OTHER PUBLICATIONS

MarharrUK, HttpTransportSE.java, GitHub Gist website, 2 pages, Aug. 12, 2011.*

(Continued)

*Primary Examiner* — Thuy Dao
(74) *Attorney, Agent, or Firm* — Miller Nash Graham & Dunn LLP

(57) ABSTRACT

A computer-controlled method for a mobile application invoking a web service can include an application development framework (APPDF) mobile framework component creating an envelope for a request and passing the envelope to a transport component. The transport component can create a proxy for the envelope and a proxy for a connection based on an enforcement context. The transport component can stream the proxy envelope through the proxy connection to the web service.

18 Claims, 4 Drawing Sheets

Related U.S. Application Data

(60) Provisional application No. 61/800,701, filed on Mar. 15, 2013, provisional application No. 61/747,913, filed on Dec. 31, 2012, provisional application No. 61/747,924, filed on Dec. 31, 2012.

(51) Int. Cl.
| | |
|---|---|
| *G06F 15/173* | (2006.01) |
| *H04L 29/06* | (2006.01) |
| *H04L 12/24* | (2006.01) |
| *G06F 8/71* | (2018.01) |
| *G06F 9/445* | (2018.01) |
| *G06F 8/61* | (2018.01) |
| *G06F 9/4401* | (2018.01) |

(52) U.S. Cl.
CPC ........ *H04L 29/06326* (2013.01); *H04L 63/20* (2013.01); *H04L 65/1063* (2013.01); *H04L 67/02* (2013.01); *H04L 67/20* (2013.01); *H04L 67/28* (2013.01); *G06F 9/4411* (2013.01)

(58) Field of Classification Search
CPC ... H04L 65/60; H04L 65/1511; H04L 41/509; H04L 41/5041; G06Q 10/10
See application file for complete search history.

(56) References Cited

U.S. PATENT DOCUMENTS

| | | | |
|---|---|---|---|
| 7,698,398 B1 | 4/2010 | Lai | |
| 8,069,435 B1 | 11/2011 | Lai | |
| 8,291,378 B2 | 10/2012 | Arnold et al. | |
| 8,402,432 B2* | 3/2013 | Shenfield | H04L 29/06 |
| | | | 717/114 |
| 8,478,812 B2 | 7/2013 | Oliver et al. | |
| 8,346,929 B1 | 8/2013 | Lai | |
| 8,688,858 B2* | 4/2014 | Vorobyev | G06F 9/5044 |
| | | | 709/201 |
| 8,775,649 B2* | 7/2014 | Blaukopf | G06F 8/00 |
| | | | 709/203 |
| 8,918,387 B1 | 12/2014 | Sokolov | |
| 8,990,266 B2* | 3/2015 | Shea | G06F 16/972 |
| | | | 707/803 |
| 2003/0009253 A1 | 1/2003 | McIntyre et al. | |
| 2003/0229890 A1 | 12/2003 | Lau et al. | |
| 2004/0103407 A1 | 5/2004 | Blaukopf et al. | |
| 2004/0199614 A1* | 10/2004 | Shenfield | H04L 29/06 |
| | | | 709/220 |
| 2005/0044197 A1 | 2/2005 | Lai | |
| 2005/0066019 A1 | 3/2005 | Egan et al. | |
| 2006/0004662 A1* | 1/2006 | Nadalin | H04L 63/02 |
| | | | 705/50 |
| 2006/0036941 A1 | 2/2006 | Neil | |
| 2006/0047665 A1 | 3/2006 | Neil | |
| 2006/0122939 A1 | 6/2006 | Cohen et al. | |
| 2006/0130041 A1 | 6/2006 | Pramanick et al. | |
| 2006/0235882 A1 | 10/2006 | Mateescu et al. | |
| 2006/0236254 A1 | 10/2006 | Mateescu et al. | |
| 2006/0236306 A1 | 10/2006 | DeBruin et al. | |
| 2008/0014929 A1* | 1/2008 | Padmanabhun | H04W 4/00 |
| | | | 455/432.1 |
| 2008/0168523 A1 | 7/2008 | Ansari et al. | |
| 2008/0172482 A1* | 7/2008 | Shah | H04L 41/0213 |
| | | | 709/223 |
| 2008/0270462 A1 | 10/2008 | Thomsen | |
| 2009/0030773 A1* | 1/2009 | Kamhoot | G06Q 30/00 |
| | | | 705/7.32 |
| 2009/0031284 A1* | 1/2009 | Shenfield | H04L 29/06 |
| | | | 717/114 |
| 2011/0078675 A1 | 3/2011 | Van Camp et al. | |
| 2011/0252038 A1 | 10/2011 | Schmidt et al. | |
| 2011/0277027 A1 | 11/2011 | Hayton et al. | |
| 2011/0302656 A1 | 12/2011 | El-Moussa | |
| 2012/0084769 A1 | 4/2012 | Adi et al. | |
| 2012/0204032 A1 | 8/2012 | Wilkins et al. | |
| 2012/0226530 A1 | 9/2012 | Gebb et al. | |
| 2013/0085841 A1 | 4/2013 | Singleton et al. | |
| 2013/0097129 A1* | 4/2013 | Shea | G06F 16/972 |
| | | | 707/693 |
| 2013/0139183 A1 | 5/2013 | Mallur et al. | |
| 2013/0152047 A1 | 6/2013 | Moorthi et al. | |
| 2013/0219176 A1* | 8/2013 | Akella | H04L 63/0815 |
| | | | 713/165 |
| 2013/0282752 A1 | 10/2013 | Day-Richter et al. | |
| 2014/0101734 A1 | 4/2014 | Ronda et al. | |
| 2014/0188972 A1 | 7/2014 | Bryan et al. | |

OTHER PUBLICATIONS

Chintan Rathod, How to Call Web Service in Android Using SOAP, 19 pages, May 29, 2012.*
Phan et al., A benchmark on soap's transport protocols performance for mobile applications, 6 pages (Year: 2006).*
S. Indrakanti and V. Varadharahan, "An Authorization Architecture for Web Services," Data and Applications Security 2005, LNCS 3654, pp. 222-236, 2005.
P. Pocatilu, "Java ME Clients for XML Web Services," Revista Informatica Economica, pp. 66-70, 2008.
B. Overreinder and F. Brazier, "Web Service Access Management for Integration with Agent Systems," SAC'08, pp. 1854-1860, Mar. 16-20, 2008.
C. VanLengen and J. Haney, "Creating Web Services Using asp. net.", Consortium for Computing Sciences in Colleges, pp. 262-274, 2004.
Katherine Radeka, Designing a web services project for maximum value: the 90-day challenge, Nov. 4-8, 2002, Retrieved from internet: ,URL: https://dl.acm.org/citation.cfm?id=604259> 13 pages (1-4 and 1-9).
Diego Zuquim et al., Web service security management using semantic web techniques, Mar. 16-20, 2008 Retrieved from the Internet: <URL: https://dl.acm.org/citation.cfm?id=1364225> 5 pages (2256-2260).

* cited by examiner

DEFINING CONFIGURABLE CHARACTERISTICS OF A PRODUCT AND ASSOCIATING CONFIGURATION WITH ENTERPRISE RESOURCES

CROSS-REFERENCE TO RELATED APPLICATIONS

This application is a continuation of U.S. patent application Ser. No. 14/012,892, titled "DEFINING CONFIGURABLE CHARACTERISTICS OF A PRODUCT AND ASSOCIATING CONFIGURATION WITH ENTERPRISE RESOURCES" and filed Aug. 28, 2013, which claims benefit of provisional patent application 61/747,913 and 61/747,924, both filed Dec. 31, 2012; and provisional patent application 61/800,701, filed Mar. 15, 2013, all of which are incorporated by reference herein their entirety.

BACKGROUND

When managing resources that exist within an enterprise, the ability to describe such resources, including their logical structure and relationships with each other, is critical for allowing an administrator to visualize the enterprise. It is also important to use well-established and standardized mechanisms (such as those defined by the WS-Policy and WS-SecurityPolicy standards) when configuring resources behavior, especially with regard to how access to such resources will be secured. It is also helpful to allow administrators to associate arbitrary metadata (e.g., aliases, categories, or pointers to related information) with the resources they are managing.

However, every platform has its own method for describing the structure of its resources and the metadata that describe them. Further, such methods rarely provide a mechanism for an administrator to associate additional metadata with them, especially metadata required for configuring the behavior of third-party add-on products (e.g., Oracle Web Services Manager). In those situations where a platform actually provides some type of mechanism to store custom metadata, however, it is generally proprietary to the platform, thus making any solutions for managing third-party resources difficult and potentially prohibitively expensive to develop, especially if the product is to consistently manage resources in multiple, differing platforms.

Many enterprise products provide an ability to configure certain aspects of its behavior. One of the current solutions is to express all of the associated information as a simple, flat collection of name-value pairs or dictionary (e.g., where each name identifies one aspect of the product to be configured) and store the collection as either a block of plain text or simple XML document or database table.

Mobile applications are a rapidly expanding market. With the meteoric rise in the use of smart phones and tablets in recent years, businesses are seeking solutions to enable remote access to their services from these devices. Since many of these interactions will happen via the "cloud" (e.g., over the public Internet), it is critical that access to these services be secured. Minimally, this requires that mobile clients be authenticated but, in many cases, it also requires that messages be protected from interception and modification.

Current authentication mechanisms vary widely. Since these interactions are typically built on an HTTP transport model, the standard HTTP Basic authentication scheme is frequently used. Additionally, other new authentication mechanisms (e.g., OAUTH) are emerging and growing in popularity. For SOAP services, [WS-SecurityPolicy] provides more advanced authentication mechanisms, such as those based on the use of SAML tokens.

Message protection typically involves keeping the contents of a message confidential (e.g., preventing inspection by a third party) and ensuring that the integrity of a message is protected (e.g., preventing modification thereof). As with authentication, there are a wide number of algorithms that are currently employed to fulfill this. However, many of those that are performed at the message layer are computationally expensive, often prohibitively so on the constrained platform available on mobile devices. Therefore, most message protection is done at the transport layer using secure sockets (SSL).

Service-oriented client applications that access SOAP web services and RESTful resources often must ensure that the requests they send to a service adhere to certain requirements prescribed by the service. For example, the service might require that all clients provide a special token that identifies the user on whose behalf a request is being made. This is currently accomplished by building the client application using a comprehensive client library that provides a rich set of features to support various service-side requirements. This is often one that implements a standard API (e.g., WLS JAX-WS for SOAP or Jersey JAX-RS for REST). While this may work well in environments with relatively few constraints, such as within a JEE container, in tightly constrained environments (e.g., the iOS or Android mobile platforms) it is often unacceptable to require large, multi-megabyte libraries to enforce these behaviors. In the absence of any native support being provided by the platform, application developers are thus forced to implement each variation themselves.

Thus, there remains a need for a way to address these and other problems associated with the prior art.

DETAILED DESCRIPTION

Figure 1:
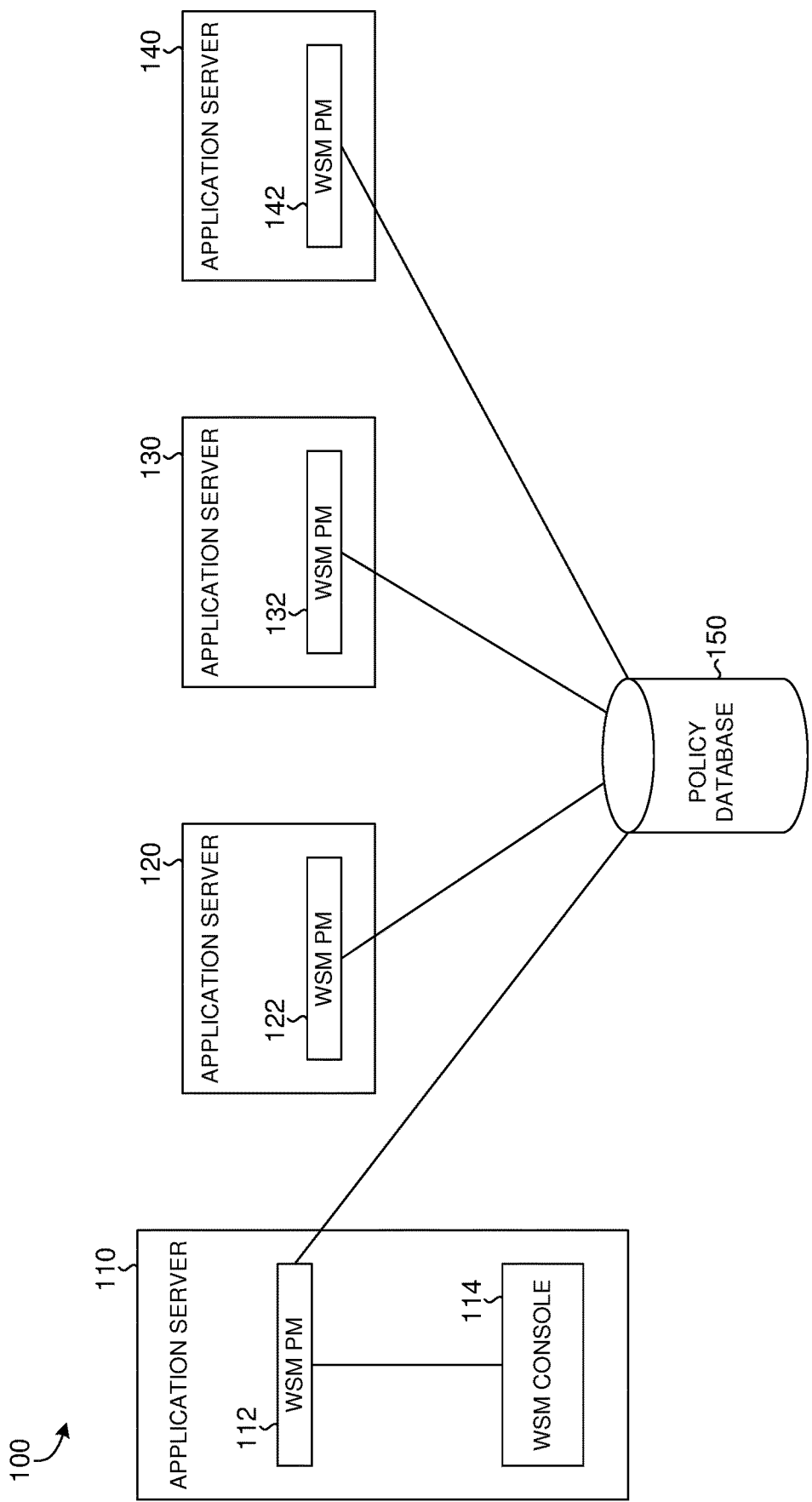
FIG. 1 illustrates an example of an architecture of a web services manager (WSM) within a heterogeneous enterprise in accordance with certain implementations of the disclosed technology.

FIG. 1 depicts the architecture 100 of a web services manager (WSM) within a heterogeneous enterprise. This illustrates the relationship between application resources, WSM components, WI applications and the WSM metadata repository. In the example, four application servers or instances 110, 120, 130, 140, such as WebLogic Server (WLS) domains, WebSphere software, or JBoss servers, each have a WSM Policy Manager (PM) 112, 122, 132, 142, respectively, that are configured to interact with a policy database 150. Also in the example, the WSM PM 112 of the first server/instance 110 is further configured to interact with a WSM Console 114, which may manage resource registration and Web Service (WS) policy attachment as described below.

A new WSM Console may be created to provide a WI for managing third party enterprises. The WSM Console may provide an administrator with easy access to the most common management tasks relevant for third party enterprises. This may include application registration/modification, policy attachment/detachment, and agent/PAP configuration. Secondary tasks currently supported by EM (i.e. DMS, enforcement audit reporting, PSEC/Audit configuration, policy authoring, global policy attachment, and policy usage analysis) that could be relevant for third party enterprises may or may not be supported.

Figure 2:
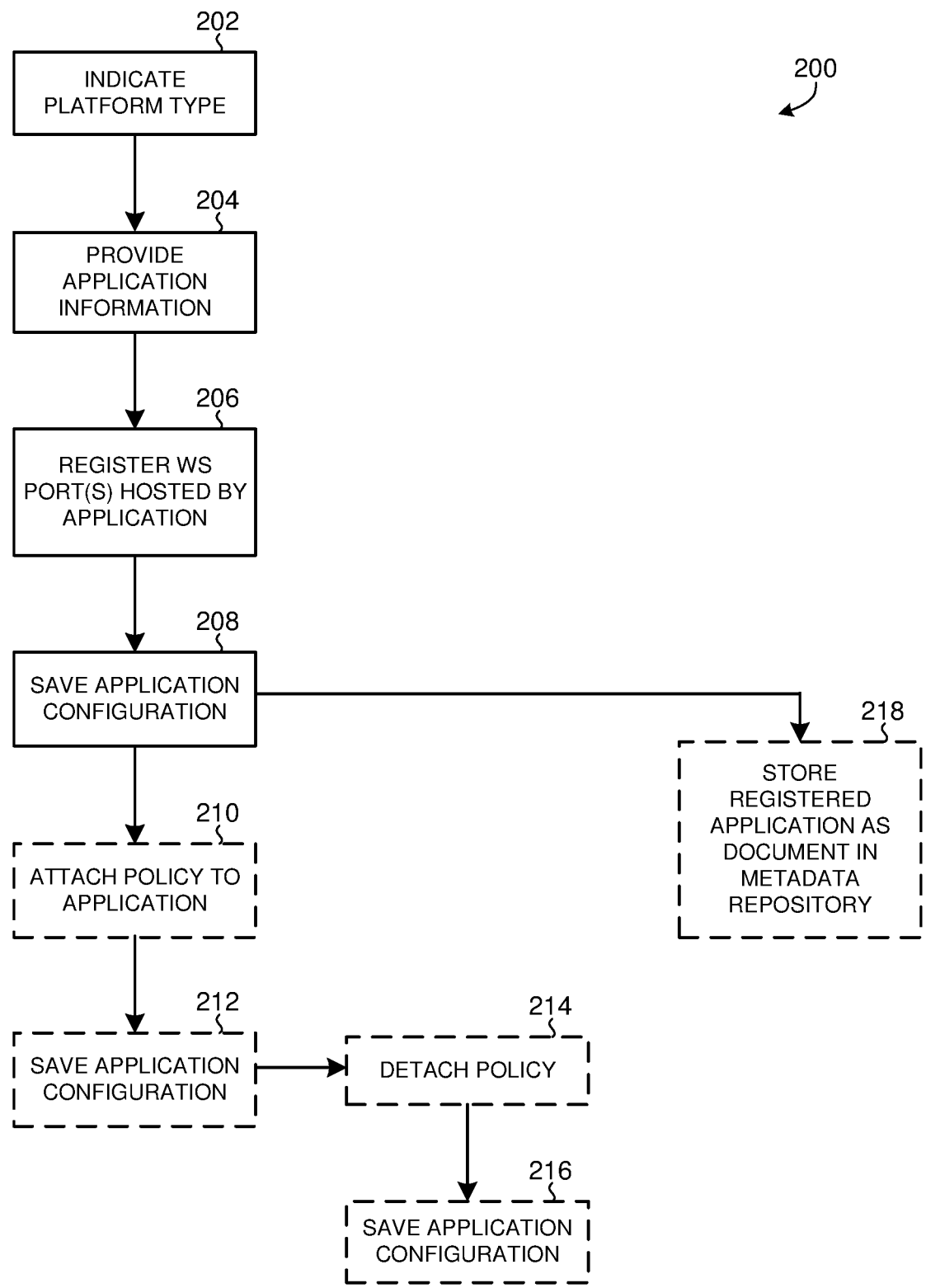
FIG. 2 illustrates an example of computer-controlled method of registering an application with a web services manager, such as the web services manager illustrated by FIG. 1, in accordance with the disclosed technology.

FIG. 2 illustrates an example of computer-controlled method 200 of registering an application with a web services manager, such as the web services manager illustrated by FIG. 1, in accordance with the disclosed technology. At 202, a type of platform is indicated. At 204, application information is provided. At 206, one or more WS ports hosted by the application are registered. The application configuration is then saved, as shown at 208. In certain embodiments, a policy may be attached to the application and the application configuration may then be saved, as shown at 210 and 212, respectively. In such embodiments, the policy may be subsequently detached and the application configuration again saved, as shown at 214 and 216, respectively. In certain embodiments, the registered application may be stored as a document within a WSM metadata repository, as shown at 218. Various examples of the illustrated method 200 are described below.

New applications may be registered with Web Services. This registration process may include the following:
1. Indicate the type of platform (e.g. WebSphere).
2. Provide application information (e.g. name, description; cell name, servers, etc.).
3. Register web service port(s) hosted by the application. If a WSDL is available, then provide module name and associated WSDL file—the contents of the WSDL will be parsed to determine the hosted service and port names. If a WSDL is not available, then provide the module, service, and port names manually. Repeat as needed to register all services.
4. Save the application configuration.

New applications may be registered with Web Service Clients. This registration process may include the following:
1. Indicate the type of platform (e.g. WebSphere).
2. Provide application information. This would include its: name (required); description (optional); and any relevant topology fields, such as cell, servers, etc. (optional).
3. Register web service client port(s) hosted by the application by providing the module, client, and port names manually. Repeat as needed to register all services.
4. Save the application configuration.

New applications may be registered with both Web Services and Web Service Clients. This registration process may include the following:
1. Indicate the type of platform (e.g. WebSphere).
2. Provide application information. This would include its: name (required); description (optional); and any relevant topology fields, such as cell, servers, etc. (optional).
3. Register web service port(s) hosted by the application. If a WSDL is available, then provide module name and associated WSDL file—the contents of the WSDL will be parsed to determine the hosted service and port names. If a WSDL is not available, then provide the module, service, and port names manually. Repeat as needed to register all services.
4. Register web service client port(s) hosted by the application by providing the module, client, and port names manually. Repeat as needed to register all clients.
5. Save the application configuration.

A policy may be attached to a registered application. This attachment process may include the following:
1. Navigate to desired application within enterprise or search for registered applications by application name.
2. Navigate to desired client or service port (following module, client/service, and port hierarchy) within application, or search for a port its type and name.
3. Select one or more policies to be attached to port. A list of compatible policies may be presented to guide selection and may filter out those that are not compatible with the platform or port type. The list may also provide an option to search by policy name.
4. Validate policy subject. This may be used to confirm whether the policies attached to the port (if there is more than one) are compatible with each other.
5. Save the application configuration.

A policy may be detached from a registered application. This detachment process may include the following:
1. Navigate to desired application within enterprise or search for registered applications by application name.
2. Navigate to desired client or service port (following module, client/service, and port hierarchy) within application, or search for a port by its type and name.
3. Select one or more policies to be detached from port.
4. Save the application configuration.

Application registration may be used to describe an application that has been deployed in an enterprise. The registration process may require the administrator to provide all relevant topology information about the deployed application. This may include details such as the type of platform (e.g., WebSphere or JBOSS), name of the management domain (e.g., cell in WebSphere), and server or servers to which it has been targeted.

A registered application may be stored as a document within a WSM metadata repository. The creation, deletion, or modification of a registered application may be audited using a Common Audit Framework. An audit record may be generated when modifying a registered application to indicate the application that was modified, but may not indicate the nature of the modification, including any attachment or detachment of policies.

Database-based metadata repositories may provide support for document versioning. In these environments, an administrator may be able to view an earlier version of a registered application or make an earlier version the current one. Making an earlier version of the current one will generally result in a new version that is an exact copy of the one that was restored.

Port registration may be used to describe the [client or service] ports that are being hosted by a registered application. The registration may require the administrator to provide all relevant structural information about a port. This may include details such as the type and name of the module that is hosting it, the type of port (e.g., client or service), the name of the enclosing client or service, and the name of the port itself.

The module, client/service, and port names will generally match those that are understood by the hosting third party web service stack. Typically, these logical names are derived from the physical names for the corresponding entities. A port registration may be stored within a registered application document describing the application that is hosting it.

During registration, an administrator may provide the names of the hosting module, client, and client port. If it is available, the administrator may also supply the URL for a WSDL describing the service that a client port connects to. The information within the WSDL may be used to guide the attachment of compatible policies to a client port.

The URL for a WSDL may be modified after registration, but the other data generally cannot be changed. If the data needs to be adjusted, the relevant port registration may be deleted and a new one declared.

During registration, the administrator may provide the name of the hosting module, service, and service port. If it is available, the administrator may instead supply the name of the hosting module and the URL of the WSDL associated with it. When provided, the WSDL may be scanned and each service port it contains may be automatically declared.

While the URL for the WSDL may be changed after registration, other information provided during registration generally cannot be changed. If such data needs to be adjusted, the relevant port registration may be deleted and a new one declared.

Resource management generally allows an administrator to view or modify the registered applications in an enterprise. This may include the ability to unregister an application, unregister any of the ports a registered application hosts, or register an additional port in an existing registered application.

The task of locating a specific registered application or port registration may be time consuming in an enterprise that hosts a large number of resources, but the administrator may simplify this process by providing relevant criteria in a search for resources. An administrator may be able to search for registered applications by supplying any combination of platform type, management domain, and application name criterion. Similarly, the administrator may be able to search for port registration by supplying any combination of platform type, management domain, application name, module name, port type, and port name criterion. To further simplify the process, the administrator may be able to include an asterisk (*) wildcard character for a name-type criterion that will match any number of characters in its place.

exportRepository and importRepository CLI commands may provide a mechanism to migrate the contents of a WSM repository from one environment to another. This may be used to migrate a verified configuration from a test environment to a production environment. Because the target environment often uses different names for its entities, the importRepository command may allow an administrator to provide a file that describes how to map physical information from the source environment to the target environment. This may be used to transform each document as it is imported to ensure that it is valid.

Physical information in a registered application resource may be updated during import. This may include the ability to rename the management domain, modify the list of servers to which a registered application has been targeted, and update the URL of a WSDL that has been associated with a [client or service] port. The command will generally not support the migration of registered applications from one platform to another or the modification of the port registrations hosted in a registered application.

A feature may provide an administrator with the capability to attach web service policies to the [client and service] ports within an enterprise. These attachments may be declared external to the native deployment descriptors of the hosting application. This mechanism may operate independent of, and exclusive to, an existing global policy attachment feature.

Attachment by reference may be used to attach policies to a port registration by providing the URI (e.g., within a WSM metadata repository) of the desired policy. The runtime may automatically retrieve the policy from the repository when it needs to enforce the behavior it describes. The administrator may be able to attach or detach any number of policies as well as indicate whether each policy reference is enabled or disabled.

A policy attachment may be stored within the registered application document containing the port registration it is attached to. The policy attachment will generally not be managed as an independent resource.

Policy subject configuration analysis may be used to validate a port's configuration, validate that the set of attached policies are compatible with each other, and determine whether it is secured or not. A port is generally considered secure if one or more of the assertions in the policies attached to it enforce a security behavior.

Compatible client policy selection may be used to determine the URIs of the policies that are compatible with the service a client interacts with. If the WSDL of the service is available, then the administrator may request a list of the policies that are compatible with it and select from it the policies to attach to the client port.

Scoped configuration overrides may be used to provide properties that affect the behavior of the assertions within a policy. A configuration override may be expressed as a simple name-value pair. The effect of a given property generally depends on the assertions it is applied to. The administrator may be able to define any number of configuration overrides that are scoped to a specific policy attachment. Each policy may expose the properties that it recognizes and their default values. This information may be used to assist an administrator with providing relevant configuration overrides for each attachment.

A configuration override may be stored within the registered application document containing the policy attachment it is configuring. The product may implement features to assist with managing configuration and providing an inventory of third party agent installations.

A feature may provide an administrator with the capability to centrally manage product configuration. This may include the ability to specify the PM connection information, cache refresh rates, nonce timeout, clock skew, and other similar configuration parameters.

Product configuration parameters may be stored in a WSM metadata repository. An agent instance may use bootstrap connection information specified during installation to connect to the PM to retrieve its full configuration. Whenever a configuration parameter is added, modified, or removed, the agent will generally update its active configuration and persist the full set of parameters locally for the next time it initializes. The detection of configuration changes may be performed periodically using a configurable polling mechanism.

An administrator may be able to specify the value for each supported parameter and have it applied to all agents within a management domain. Additionally, some parameters may allow the administrator to override a value for a single server or application.

A feature may provide an administrator with the capability to inventory third party agent installations within an enterprise. This inventory may track various statistics about each installation, including the hosting platform, its version, and the version of the WSM product in use. The inventory will generally include relevant details about each management domain and server. It may also indicate which applications have been configured to support a third party agent.

Certain embodiments of the disclosed technology are generally directed toward techniques for managing multiple resources in an enterprise in an independent and consistent manner regardless of the native capabilities of the platform containing them. Such embodiments generally allow a management product (e.g., a Web Services Manager) to easily support any third-party platform without any dependency on features that are specific to the platform.

Certain embodiments of the disclosed technology are generally directed toward techniques for describing the structure, or model, of various types of physical and/or logical resources in an enterprise (e.g., traditional entities such as applications, servers, management domains, platforms, and the enterprise itself) and the relationships that exist between instances of such resources. Alternatively or in addition thereto, embodiments may be generally directed toward defining different types of virtual resources in an enterprise that can be used to represent various collections of resources that are either defined statically (i.e., having a constant set of members) based on identifying specific resource instances or defined dynamically (i.e., having a variable set of members) based on the current characteristics of resource instances.

Certain embodiments of the disclosed technology are generally directed toward techniques for describing specific instances of a resource type along with any standard or custom characteristics that may be relevant thereto. Such techniques may also include attaching web service policies to any part of a resource structure that describes behaviors to be enforced during interactions with the resource.

A model metadata component may define a schema used to describe a type of resource or model using an XML infoset. The following describes certain attributes and elements that may be in the schema:

/model@name: This attribute may define the name of the model. An instance will indicate the model it is based on using this name.

/model@kind: This attribute may define the kind of model. The value may be ENTERPRISE (for an Enterprise model), TOPOLOGY (for a Domain, Platform, or Server model), or DEPLOYABLE (for an Application model). Each kind may place a set of restrictions on the content of the model and its instances.

/model@locked: This attribute may indicate whether clients should be prevented from modifying this model. The value may be true for all seed models.

/model@restriction: This attribute may indicate restrictions placed on instances of the model. The value may be MODIFY (indicating that a client is not permitted to modify, create, or delete an instance), CREATE (indicating that a client is not permitted to create or delete an instance), or NONE (indicating that a client is permitted to modify, create, or delete an instance).

/model@term: This attribute may define the primary resource pattern term associated with instances of the model. The term may be used as a prefix for the path of the document that stores an instance of a model in the repository. A value may be provided for all seed models.

/model@path: This attribute may define the relative path of the directory containing an instance of the model. The value may contain literal characters, path separators ("/"), or field references in the form "${field_name}".

/model/descriptions: This element may contain a collection of localized display names and descriptions to be used when displaying information about the model in a user interface (UI).

/model/field: This element may define the fields that are natively recognized by an instance of the model. (An instance may provide values for fields that are not specified in the model.) The field definition may contain information that a UI should use to guide the selection of legal values and that the runtime will use to perform validation. A model may have any number of these elements.

/model/field@name: This attribute may define the name of the field. An instance may indicate the field whose value it is supplying based on this name.

/model/field@required: This attribute may indicate whether a resource instance must supply a value for this field.

/model/field@multiple: This attribute may indicate whether a resource instance may supply multiple values for this field.

/model/field@term: This attribute may indicate the primary resource pattern term associated with the field. The term must generally be valid for the containing model.

/model/field@type: This attribute may indicate the type of the field and may indicate the type of validation that will be performed on the field's value. The value may be BOOLEAN (indicating a Boolean), INTEGER (indicating an integer), STRING (indicating an arbitrary string), or URI (indicating a URI). If the field contains a linkTo element, then the value of the attribute will generally be ignored. If the type is not specified and does not contain a linkTo element, then it will generally be treated as a STRING.

/model/field/descriptions: This element may contain a collection of localized display names and descriptions to be used when displaying information about a field in a UI.

/model/field/linkTo: This element may contain a collection of mappings between the fields in an instance of the model and the fields in an instance of another model.

/model/field/linkTo@model: This attribute may define the model this field links to.

/model/field/linkTo/map: This element may define the mapping of a single field in an instance of the model to a single field in an instance of another model. A linkTo may contain one or more map elements.

/model/field/linkTo/map/@sourceField: This attribute may define the name of the field in the source instance. If the attribute is not supplied, then the name of the field containing it will generally be used.

/model/field/linkTo/map/@targetField: This attribute may define the name of the field in the target instance. If the value is the empty string, then the field is generally mapped to the instance name.

/model/linkFrom: This element may define the links which may exist from instances of another model to instances of the model. This element may indicate that a UI should display the instances of resources that have linked to an instance of this model.

/model/linkFrom@model: This attribute may define the model that links to this one.

/model/linkFrom/descriptions: This element may contain a collection of localized display names and descriptions to be used when displaying information about this link in a UI.

/model/model: This element, which is generally valid only when the model's @kind attribute has the DEPLOYABLE value, contains the definition of a sub-model. This may contain the same attribute and elements in a top-level model, except for @kind, @locked, @restriction, and linkFrom.

A Policy Manager component may store model metadata in its document repository. The type of these documents is generally model and the URI of these documents is generally the name of the model. Model metadata may be accessed using a document manager component of the Policy Manager.

An instance metadata component may provide a schema to describe a specific resource as an instance of a resource model using an XML infoset. The following describes certain attributes and elements in such a schema:

/resource@name: This attribute may indicate the name of the instance.

/resource@model: This attribute may indicate the name of the model the instance is based on.

/resource@{field: any}: This attribute may provide a value for one field. Most fields will generally be defined by the model, but an instance can store values for custom fields.

/resource/descriptions: This element may contain a collection of localized display names and descriptions to be used when displaying information about the resource instance in a UI.

/resource/wsp:PolicyReference: This element may contain a reference to a policy.

/resource/wsp:PolicyReference/@orawsp:category: This attribute may indicate the category of the policy.

/resource/wsp:PolicyReference/@orawsp:status: This attribute may indicate whether the reference is enabled (meaning that the runtime will enforce the policy) or disabled (meaning that the runtime will ignore the policy).

/resource/definitions: This element may contain a collection of the supported configuration properties, along with localized descriptions and default values. This element will generally be provided only for instances of the Enterprise resource model.

/resource/resource: This element, which is generally valid only when the model's @kind attribute has the DEPLOYABLE value, may contain a sub-instance. This will generally contain the same attribute and elements in a top-level instance, except for definitions.

A Policy Manager component may store instance metadata in its document repository. The type of these documents is resource and the URI of these documents is indicated by its model. Instance metadata may be accessed using a document manager component of the Policy Manager.

A properties metadata component may provide a schema to describe the configuration or inventory of a specific resource using an XML infoset. The following describes certain attributes and elements that may be in the schema:

/properties@type: This attribute may indicate the type of properties. This may be CONFIGURATION (if the properties are used to configure a runtime) or INVENTORY (if the properties are used to describe a host environment).

/properties@resource: This attribute may indicate the URI of the instance associated with the configuration.

/properties/property: This element may contain one or more values for a named property. A configuration element may contain any number of property elements.

/properties/property@category: This attribute may identify the category of the property. This may be used to group related properties.

/properties/property@name: This attribute may identify the name of the property.

/properties/property/value: This element may specify a value for the property. A property element generally must contain either one or more value elements or one or more values elements.

/properties/property/values: This element may specify a set of values for the property. A property element generally must contain either one or more value elements or one or more values elements.

/properties/property/values@group: This element may specify a group name for the values it contains.

/properties/property/values/value: This element may specify a value for the property. A values element generally must contain one or more value elements.

A Policy Manager component may store properties metadata in its document repository. The type of these documents is the lowercase form of their @type attribute and the URI for these documents is the value of their @resource attribute. Configuration properties metadata may be accessed using a document manager component of the Policy Manager. Inventory properties metadata may be accessed using a usage tracker component of the Policy Manager.

A seed model metadata component may define a set of documents describing the models predefined by the product. Each document may be loaded into the repository during seeding operations performed by the existing upgrade manager bean APIs.

Enterprise model metadata may be used to describe an enterprise that is managed by the product and access the configuration properties supported by the product. Because the product can typically manage only a single enterprise, attempts to create an Enterprise instance will usually result in an error.

Search criterion identifying the model may be the following: model/Enterprise Search criterion identifying an instance of the model may use the following pattern:
resource/ENTERPRISE/<instance-name>

Platform model metadata may be used to describe a platform certified for use by the product. Because the product can typically manage only certified platforms, attempts to create or modify a Platform instance will usually result in an error.

Search criterion identifying the model may be as follows: model/Platform

Search criterion identifying an instance of the model may use the following pattern:
resource/PLATFORM/<instance-name>

Domain model metadata may be used to describe a management domain that is managed by the product.

Search criterion identifying the model may include the following:
model/Domain

Search criterion identifying an instance of the model may use the following pattern:
resource/DOMAIN/<platform-name>/<instance-name>

Server model metadata may be used to describe a server instance running in a management domain that is managed by the product.

Search criterion identifying the model may include the following:

model/Server

Search criterion identifying an instance of the model may use the following pattern:

resource/SERVER/<platform-name>/<domain-name>/<instance-name>

Application model metadata may be used to describe an application that has been deployed into a management domain managed by the product and, potentially, targeted to one or more of the domain's servers.

Search criterion identifying the model may include the following:

model/Application

Search criterion identifying an instance of the model may use the following pattern:

resource/APPLICATION/<platform-name>/<domain-name>/<instance-name>

A seed instance metadata component may define a set of documents describing the instances predefined by the product. Each document may be loaded into the repository during seeding operations performed by the existing upgrade manager bean APIs.

Certain embodiments of the disclosed technology are generally directed toward techniques for defining a product's configurable characteristics, which may also be referred to herein as properties, including the specifying of each property's name, description, structure, and default value, for example, along with indicating which resource type(s) each property may be associated with. Alternatively or in addition thereto, embodiments may be generally directed toward techniques for associating one or more supported configuration values with a resource and collecting an arbitrary set of values, which may also be referred to herein as an inventory, that describes the particular environment that is hosting the resource.

Certain embodiments of the disclosed technology may allow an administrator to model an application and its [client and service] ports by describing them in terms of the nodes and components. Furthermore, such embodiments may allow an administrator to attach security and management policies to these ports and configure their behavior.

Certain embodiments may implement a feature that provides an administrator with the capability to model the applications within an enterprise and the (client and service) ports which they host. This may be limited to J2EE applications which host web service or web service client ports using the SOAP over HTTP protocol.

Certain embodiments of the disclosed technology generally allow developers to build applications that satisfy client-side requirements without having to implement standard behaviors (e.g., providing security tokens) themselves. Such implementations may do so in a manner that builds on top of the platform's native APIs (for REST) or other commonly used lightweight libraries (for SOAP) instead of requiring a developer to learn how to use an entirely new one. Such embodiments generally define a declarative, lightweight solution for enforcing behaviors required by accessing SOAP web services and RESTful resources that requires little integration.

Certain embodiments of the disclosed technology are directed to an agent for mobile application development framework (APPDF) applications, which may be implemented as a Web Services Manager component. Such a component may provide a library that can be used by application development frameworks (e.g., APPDF-Mobile) to enforce authentication, message protection, and other behaviors for Java-based mobile clients that access REST resources and SOAP-based web services.

An APPDF-Mobile product in accordance with the disclosed technology may be used to enforce policies attached to mobile web service clients. In their architecture, web service clients may be defined by entries in the APPDF's connections.xml file, for example. These entries may indicate the location of the web service and the protocol used to access it (e.g., SOAP or RESTful). They may also specify the policies to be enforced by URI and any policy configuration properties.

Mobile applications may use the APPDF-Mobile product to access SOAP [version 1.1/1.2, for example] and RESTful web services exposed by an application deployed to an enterprise-class server (e.g., a JEE container). In an example, a SOAP service may be hosted by a WebLogic Server and be configured to use WSM to enforce security policies. For example, SOAP web services may be configured to use a seed policy that allows a client to use one of a variety of different authentication mechanisms (e.g., HTTP Basic authentication credentials, a [WS-SecurityPolicy] username token, or a [WS-SecurityPolicy] SAML token) with either [WS-SecurityPolicy] message protection or SSL.

An agent for mobile applications in accordance with the disclosed technology may provide the ability to enforce pre-defined security and management scenarios when making requests to REST resources and SOAP-based web services. A scenario to be enforced may be specified in the form of a URI that references a web service policy document (e.g., expressed using the [WS-Policy] language) that contains one or more assertions that define the desired behavior. Additionally, a reference may be accompanied by configuration properties that override the default behavior defined by the policy.

Such an agent for mobile applications may be packaged with a framework (e.g., [APPDF-Mobile]) that provides facilities for developing mobile applications including Java-based business logic that accesses REST resources or SOAP-based web services. Rather than being directly consumed by an application's business logic, the agent may act as an internal component supporting the application development framework.

An agent for mobile applications in accordance with the disclosed technology may be delivered to consuming frameworks in the form of a library (e.g., packaged as a set of Java archives (JAR files)) to be included with the customer's application. The framework will be generally responsible for calling the relevant APIs provided by the library to initialize the agent and integrating it with the appropriate web service stack (e.g., [kSOAP2]) before client requests and server responses are processed.

Embodiments of the disclosed technology may be integrated with systems that use separate specific abstractions for web service messages and the transports used to send/receive them.

Figure 3:
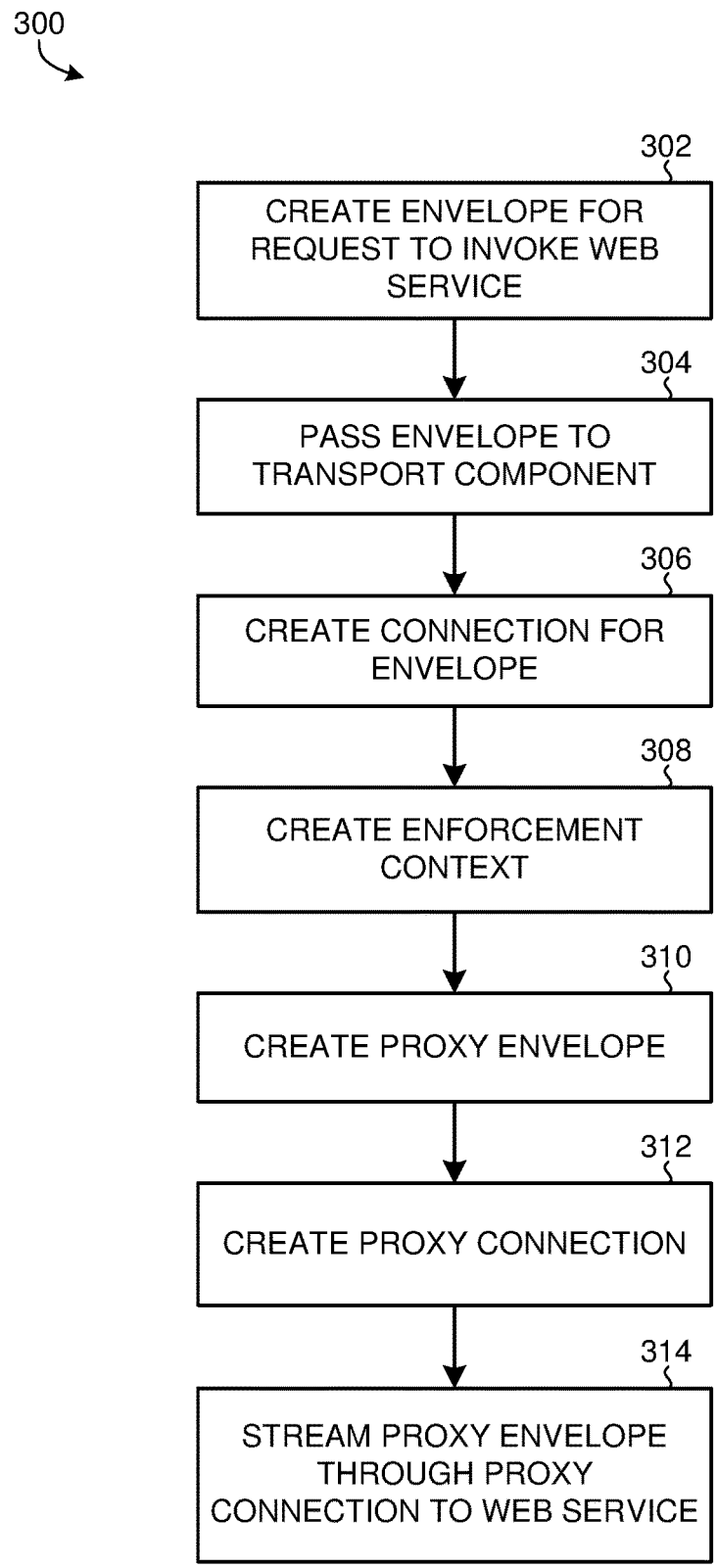
FIG. 3 illustrates a first example of computer-controlled method of incorporating an agent for mobile application development framework (APPDF) applications in accordance with the disclosed technology.

FIG. 3 illustrates a first example of computer-controlled method 300 of incorporating an agent for mobile application development framework (APPDF) applications in accordance with the disclosed technology. At 302, an envelope is created for a request from a mobile application to invoke a web service. At 304, the envelope is passed to a transport component, which creates a connection through which the envelope will be sent and also uses an agent to create an enforcement context, as shown at 306 and 308, respectively. A proxy envelope and proxy connection may then be created based on the enforcement context, as shown at 310 and 312, respectively. At 314, the proxy envelope is streamed through the proxy connection to the web service. An example of the illustrated method 300 is now described.

In the example, a Mobile Application initializes the APPDF Mobile Framework before it can invoke SOAP-based web services. Internally, the APPDF Mobile Framework manages a list of APPDF Connection components, one for each callable web service. When an APPDF Connection component is created for a SOAP web service, it creates one instance of a kSOAP2 HTTP Transport component to call the web service and one instance of the WSM kSOAP2 Agent component to enforce policies attached to it (according to the Configuration supplied to it).

When a Mobile Application (1) invokes a web service, the APPDF Mobile Framework component (2) creates an envelope for a request (a kSOAP SOAP Envelope component) and then (3) calls the service by passing the envelope to the kSOAP2 HTTP Transport component created during initialization. The transport (4) creates a connection (based on a kSOAP2 Service Connection) through which the envelope will be sent and uses the agent to (5) create an enforcement context. This context is used to create proxies for both the envelope (a WSM SOAP Envelope Proxy) and connection (a WSM Service Connection Proxy). Finally, the transport (6) streams the proxy envelope through the proxy connection to the web service.

Embodiments of the disclosed technology may be integrated with systems that use a single specific abstraction for the transportation of web service messages but do not have a specific abstraction for the messages themselves and, instead, use primitive mechanisms such as binary/text data streams. FIG. 3 illustrates an example of system implementing a Java ME HTTPConnection API in accordance with certain embodiments of the disclosed technology.

In the example, a Mobile Application initializes the APPDF Mobile Framework before it can invoke RESTful web services. Internally, the APPDF Mobile Framework manages a list of APPDF Connection components, one for each callable web service. When an APPDF Connection component is created for a SOAP web service, it creates one instance of the WSM HTTP Connection Agent component to enforce policies attached to it (according to the Configuration supplied to it).

Figure 4:
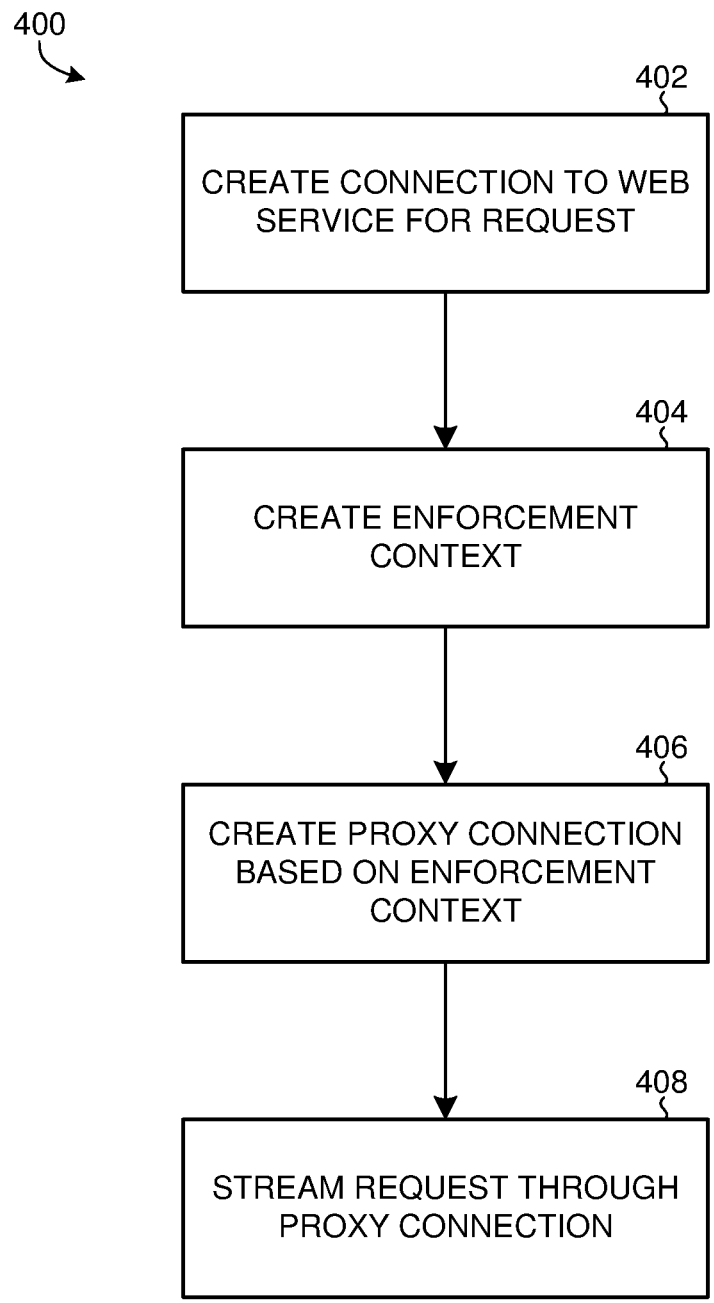
FIG. 4 illustrates a second example of computer-controlled method of incorporating an agent for mobile APPDF applications in accordance with the disclosed technology.

FIG. 4 illustrates a second example of computer-controlled method 400 of incorporating an agent for mobile APPDF applications in accordance with the disclosed technology. At 402, a connection is created through which a request to invoke a web service will be sent. At 404, an agent is used to create an enforcement context. At 406, a proxy is created for the connection based on the enforcement context and, at 408, the request is streamed through the proxy connection to the web service. An example of the illustrated method 400 is now described.

When a Mobile Application (1) invokes a RESTful web service, the APPDF Mobile Framework component (2) creates a connection (based on a Java ME HTTP Connection) through which a request will be sent and uses the agent to (3) create an enforcement context. This context is used to create a proxy for the connection (a WSM HTTP Connection Proxy). Finally, the framework (4) streams the request through the proxy connection to the web service.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A computer-controlled method for a mobile application invoking a web service, the method comprising:
    an application development framework (APPDF) mobile framework component creating an envelope for a request, wherein the envelope is a kSOAP (Simple Object Access Protocol) envelope component;
    the APPDF mobile framework component passing the envelope to a transport component, wherein the transport component is a kSOAP2 HTTP (HyperText Transfer Protocol) transport component;
    the transport component creating a proxy for the envelope based on an enforcement context;
    the transport component creating a proxy for a connection based on the enforcement context, wherein the connection is based on a kSOAP2 service connection; and
    the transport component streaming the proxy envelope through the proxy connection to the web service, wherein the proxy envelope is a WSM (Web Services Management) SOAP envelope proxy.

2. The computer-controlled method of claim 1, further comprising the transport component creating the connection through which the envelope will be sent.

3. The computer-controlled method of claim 1, further comprising the transport component using an agent to create the enforcement context.

4. The computer-controlled method of claim 1, wherein the transport component is created during an initialization process.

5. The computer-controlled method of claim 1, wherein the proxy connection is a WSM service connection proxy.

6. The computer-controlled method of claim 1, further comprising the mobile application initializing the APPDF mobile framework.

7. A computer-controlled method for a mobile application invoking a web service, the method comprising:
    an application development framework (APPDF) mobile framework component creating an envelope for a request;
    the APPDF mobile framework component passing the envelope to a transport component;
    the transport component creating a proxy for the envelope based on an enforcement context;
    the transport component creating a proxy for a connection based on the enforcement context;
    the transport component streaming the proxy envelope through the proxy connection to the web service; and
    creating an APPDF Connection component for a SOAP web service, wherein creating the APPDF Connection component comprises creating an instance of a kSOAP2 HTTP Transport component to call the web service.

8. The computer-controlled method of claim 7, further comprising the transport component creating the connection through which the envelope will be sent.

9. The computer-controlled method of claim 7, further comprising the transport component using an agent to create the enforcement context.

10. The computer-controlled method of claim 7, wherein the transport component is created during an initialization process.

11. The computer-controlled method of claim 7, wherein the proxy connection is a WSM service connection proxy.

12. The computer-controlled method of claim 7, further comprising the mobile application initializing the APPDF mobile framework.

13. A computer-controlled method for a mobile application invoking a web service, the method comprising:
    an application development framework (APPDF) mobile framework component creating an envelope for a request;
    the APPDF mobile framework component passing the envelope to a transport component;
    the transport component creating a proxy for the envelope based on an enforcement context;
    the transport component creating a proxy for a connection based on the enforcement context;
    the transport component streaming the proxy envelope through the proxy connection to the web service; and
    creating an APPDF Connection component for a SOAP web service, wherein creating the APPDF Connection component comprises creating an instance of a WSM kSOAP2 Agent component to enforce policies attached to it.

14. The computer-controlled method of claim 13, further comprising the transport component creating the connection through which the envelope will be sent.

15. The computer-controlled method of claim 13, further comprising the transport component using an agent to create the enforcement context.

16. The computer-controlled method of claim 13, wherein the transport component is created during an initialization process.

17. The computer-controlled method of claim 13, wherein the proxy connection is a WSM service connection proxy.

18. The computer-controlled method of claim 13, further comprising the mobile application initializing the APPDF mobile framework.

* * * * *

UNITED STATES PATENT AND TRADEMARK OFFICE
CERTIFICATE OF CORRECTION

| | | |
|---|---|---|
| PATENT NO. | : 10,644,929 B2 | Page 1 of 1 |
| APPLICATION NO. | : 15/467271 | |
| DATED | : May 5, 2020 | |
| INVENTOR(S) | : Bryan | |

It is certified that error appears in the above-identified patent and that said Letters Patent is hereby corrected as shown below:

In the Specification

In Column 1, Line 14, delete "application" and insert -- applications --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*